United States Patent [19]
Stone

[11] 3,787,688
[45] Jan. 22, 1974

[54] LOW LIGHT LEVEL, UNDERWATER, VIEWING DEVICE

[75] Inventor: Robert L. Stone, Oxon Hill, Md.

[73] Assignee: The United States of America as represented by the Secretary of the Army, Washington, D.C.

[22] Filed: June 12, 1972

[21] Appl. No.: 262,165

[52] U.S. Cl. .............. 250/213 VT, 2/2.1, 250/239
[51] Int. Cl. ............................................. H01j 39/12
[58] Field of Search... 9/310 H; 250/83.3 R, 83.3 H, 250/83.3 HP, 213 R, 213 VT, 239; 350/36, 319, 57, 61, 67, 143, 145, 146; 2/2.1

[56] References Cited
UNITED STATES PATENTS

| | | | |
|---|---|---|---|
| 2,635,193 | 4/1953 | Young | 250/213 VT |
| 3,064,089 | 11/1962 | Ward | 2/2.1 R |
| 2,481,808 | 9/1949 | Barna | 2/2.1 R |
| 1,377,404 | 5/1921 | Deam | 2/2.1 R |
| 2,909,959 | 10/1959 | Girden | 2/2.1 R |
| 3,454,773 | 7/1969 | Bulthuis | 250/83.3 H |
| 3,277,303 | 10/1966 | Jensen | 250/83.3 H |
| 2,871,372 | 1/1959 | Portenier | 250/239 |
| 2,058,941 | 10/1936 | Arnhym | 250/213 VT |

Primary Examiner—James W. Lawrence
Assistant Examiner—D. C. Nelms
Attorney, Agent, or Firm—Edward J. Kelly; Herbert Berl; John Holford

[57] ABSTRACT

An underwater viewing system is described which provides enhanced viewing by means of an image intensification tube. The unit is binocular and permits wide angle direct viewing as well as the more narrow intensified field of view best suited for submerged operation at night or in a low light environment.

6 Claims, 3 Drawing Figures

PATENTED JAN 22 1974          3,787,688

LOW LIGHT LEVEL, UNDERWATER, VIEWING DEVICE

The invention described herein may be manufactured, used, and licensed by or for the Government for governmental purposes without the payment to me of any royalty thereon.

BACKGROUND

Although the subject system is intended primarily for use at night the probability of encountering a low level of illumination underwater is generally much higher than it is in the atmosphere. Bodies of water are often located in low areas between hills which shade their surface. Clear water attenuates light gradually with depth and to a much greater degree when polluted. The ambient light will of course also vary with the weather, and the time of day, moonlight, starlight and artificial sources such as skyglow from city lights to further complicate the situation.

Underwater operations under the above conditions can generally be achieved by means of an auxiliary light source, but there are some exceptions. The water may be contaminated with a highly dispersed reflective substance and a light source would actually reduce the range of visibility from an underwater scene. When studying the ecology of an area the introduction of light will often disturb the process that is being observed. The light source and its power supply may also encumber the observer, so as to render him inefficient or incapable of carrying out his mission. If the mission is a clandestine one, the light source may disclose his position to hostile elements.

Systems have been evolved for surveillance in the atmosphere which use image intensifiers and far infrared converters. Since water greatly attenuates far-infrared effects, the image intensifier is considered to be the most practical for underwater service. Image intensifiers are also very sensitive to near infrared which is not so greatly attenuated. If an auxiliary near infrared source is used, it can only be detected by an observer equipped with another intensifier and marine life will generally not be disturbed.

BRIEF DESCRIPTION OF THE DRAWINGS

The above and other objects of the invention are best understood with reference to the drawings wherein.

DESCRIPTION OF THE PREFERRED EMBODIMENT

Figure 1:
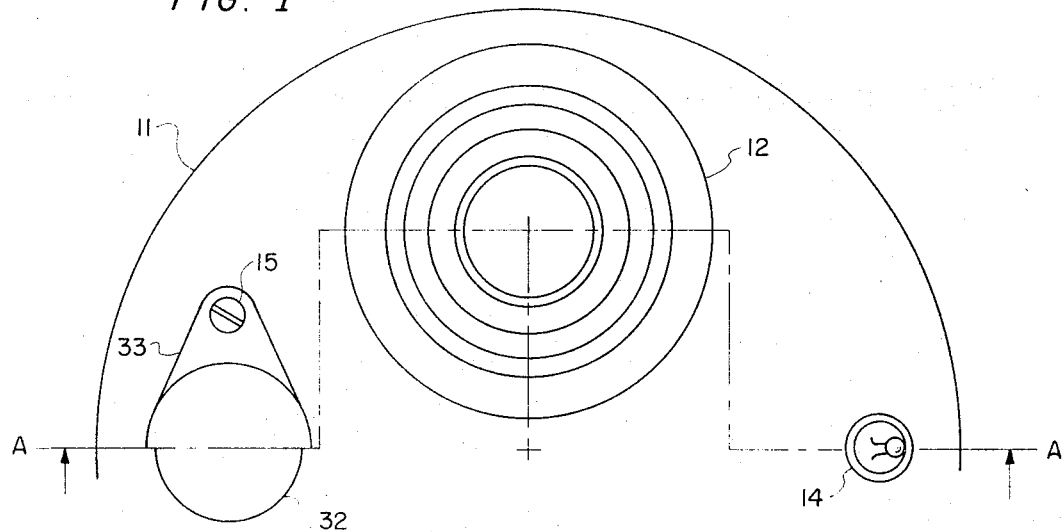
FIG. 1 shows a normal view of divers face plate cutaway along line A—A to show details of the image intensifier system according to the present invention.

Referring to FIG. 1, part of a circular face plate 11 for a divers mask is shown. The plate is bisymetrical so that the portions not included are mirror images of those portions which are shown. A pair of image intensifier assemblies 12, only one of which is shown, are mounted near opposite edges of the plate. These are separated by an average eye separation for the class of users, e.g., adult males. A battery holder 13 and a switch 14 are shown mounted through apertures at the top and bottom, respectively, of the plate on the perpendicular bisector of a centerline through the two image intensifier assemblies. These locations are not critical, but they provide a fairly even distribution of opaque images on the otherwise transparent plate.

Figure 2:
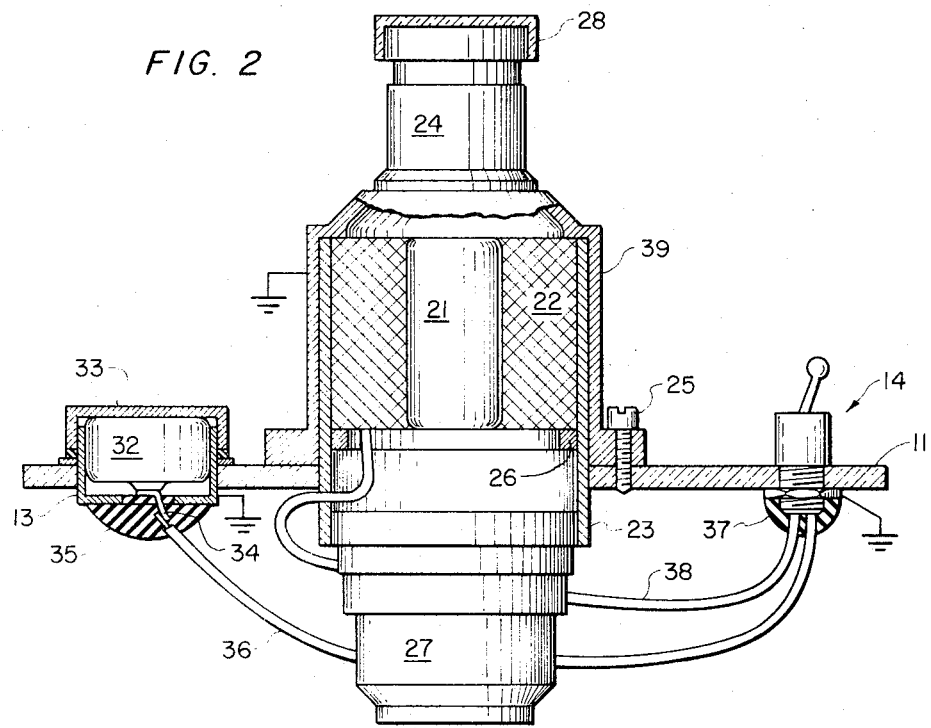
FIG. 2 shows an edge view of the plate in FIG. 1 showing details of the cutaway portions.

FIG. 2 shows the image intensifier assembly in greater detail. An image intensifier tube 21 and its voltage converter 22 are placed in a ferrule 23 which may be threaded inside an outside, if desired. This ferrule is threaded or force fitted into a ring housing 39. The upper end of the housing is threaded or otherwise adapted to receive an objective lens 24 in a sealed watertight arrangement. The housing has an inner shoulder which stops the tube at the correct focal distance from the objective lens. A threaded washer 26 engages the ferrule and the opposite end of the tube converter to hold it securely. An eyepiece attaches to the ferrule to complete the optical portion of the system. The ferrule fits through an aperture provided in plate 11 and is held in place by the ring housing which is attached to the plate by screws 25. The objective lens 24 includes a filter 28 which matches this lens to the underwater environment. It is essentially a thin flat sheet of glass or quartz and provides an airspace between the lens and the water. In a preferred commercially available arrangement the tube face is stepped adjacent the objective to permit a trifocal view. The upper, lower and center portions of tube then provide focus over the separate ranges 5 to 20 inches, 2 to 5 feet, and 5 feet to infinity.

The eyepiece permits 4 diopters of positive or negative correction for differences in eye sight and fifteen millimeters of eye relief. This permits the user to shift his gaze from the eyepiece to a wide angle direct view through the transparent plate. This lens also magnifies the image on the adjacent end of tube 21, although the overall system magnification is just unity. The image which the eyepiece sees is the same as that projected on the opposite end of the tube by the objective lens but greatly intensified by the electronic amplification provided in the tube.

The power for the tube is supplied by a 2.7 volt battery 32, preferrably of the nickel-cadmium rechargeable type. This is mounted in a Mil-Standard battery holder 33 bolted to plate 11 by fasteners 15 shown in FIG. 1. The holder is waterproof except that the positive terminal 34 must be potted with a waterproof compound 35 such as silicon rubber after lead 36 is soldered in place. Lead 36 is attached at its remaining end to one terminal of Mil-Standard waterproof switch 14. The second terminal of switch 37 is in turn connected by lead 38 to the voltage converter 22. If necessary potting compound 37 is used to seal the leads. The circuit is completed by providing a common bare conductor ground for the battery holder and converter through the conducting metal ferrule 23 and the metal housing 39. The exterior metal portions of switch 37 are also grounded to preclude corrosion. The exposed portions of the circuit being low voltage there is no safety problem. For training purposes a metal plate may be substituted for plate 11 which simplifies the grounding problem, but the transparent plate is preferred. The converter 22 which generates thousands of volts by means of doubling circuits is safely enclosed in the chamber formed by the ferrule, ring housing and lens elements. The converters now available are provided with automatic brightness controls to prevent tube saturation caused by the sudden appearance of a bright light source or scene.

Figure 3:
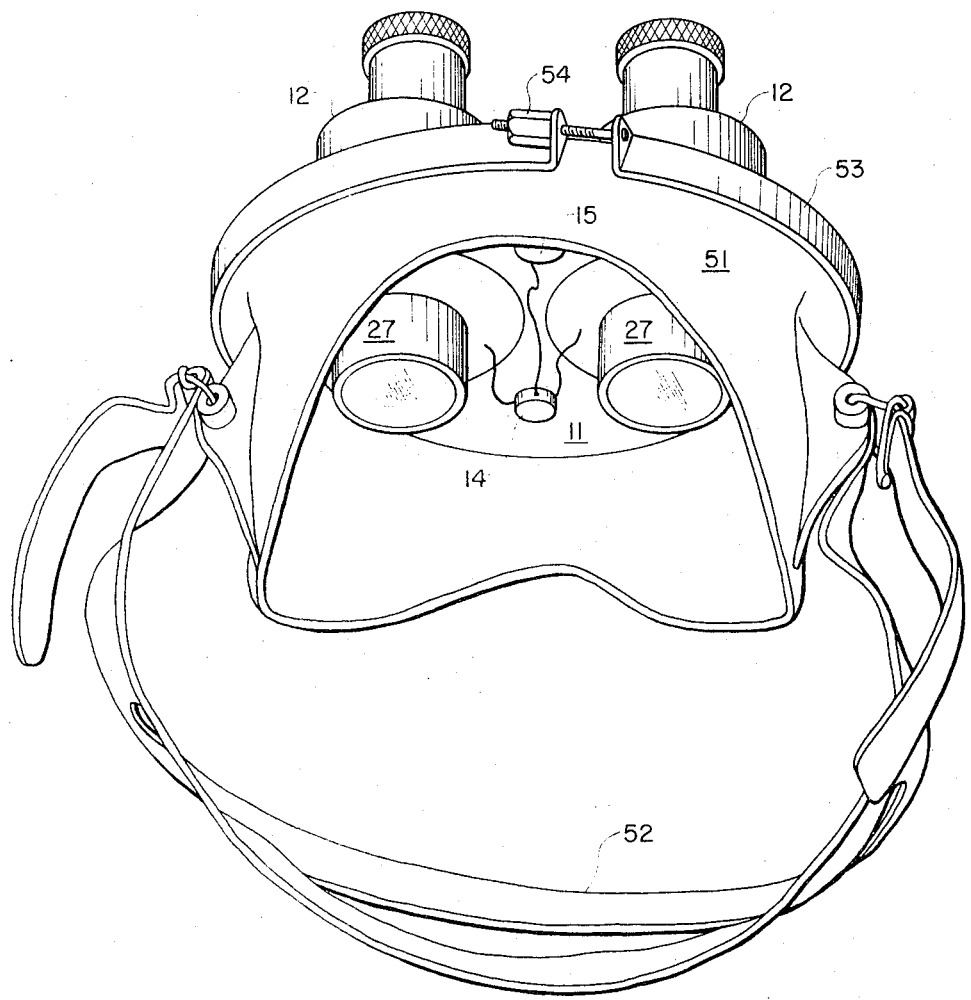
FIG. 3 shows the complete viewing system including the plate from FIG. 1 with a rubber frame and mounting straps.

FIG. 3 shown the complete viewing system. A rubber frame member 51 as found in most commercially available diving masks has a regular window edge portion which is snapped over the edge of the face plate 11 from FIGS. 1 and 2. Straps 52 engage the head of the diver to position the face mask which also has a contoured edge to maintain a watertight seal between the frame and the divers face. A metal band 53 is fitted around the frame member where it covers the edge and terminates in two upstanding ends with apertures therein. A tension bolt 54 is fitted through the apertures and drawn up to compress the frame between the band and the face plate. This prevents disengagement of the face plate, which supports considerable inertial mass, while the user is maneuvering underwater. The battery circuit wiring is also visible in this view. While the ungrounded junctions are potted to prevent mositure short circuiting, there is no danger to the operator from these low voltage circuits. The high voltage is contained in the metal objective housing which is grounded by direct contact with the water medium.

Many obvious variations of the structure disclosed variations will occur to those skilled in the art, but the invention is limited only as specified in the claims which follow.

I claim:

1. An individual swimmer's underwater viewing device for use in low and high level light environments comprising:
   a flexible frame member having a contoured edge to engage the perimeters of said individual's face in a watertight sealing relationship and a regular window edge to engage a face plate in a similar relationship;
   a face plate mounted within said regular edge, having a plurality of aperatures therein;
   an image intensifier assembly including an objective lens, a voltage converter, an image intensifier tube and a eyepiece mounted through a first of said apertures;
   a waterproof switch mounted through a second of said apertures; and
   a low voltage power supply electrically coupled through said switch to said voltage converter and intensifier tube.

2. A viewing device according to claim 1 wherein a second image intensifier assembly is mounted through a third aperature in said face plate and electrically connected through said switch to said power supply to provide a binocular system.

3. A viewing device according to claim 1 wherein said power supply is a battery and holder mounted through a fourth aperture in said face plate.

4. A viewing device according to claim 1 wherein said face plate is made from a transparent solid material.

5. A viewing device according to claim 2 wherein said face plate is made from a transparent solid material.

6. A viewing device according to claim 3 wherein said face plate is made from a transparent solid material.

* * * * *